(12) United States Patent
Miyazaki

(10) Patent No.: US 11,331,889 B2
(45) Date of Patent: May 17, 2022

(54) PLASTIC LABEL

(71) Applicant: Fuji Seal International, Inc., Osaka (JP)

(72) Inventor: Akira Miyazaki, Osaka (JP)

(73) Assignee: Fuji Seal International, Inc., Osaka (JP)

( * ) Notice: Subject to any disclaimer, the term of this patent is extended or adjusted under 35 U.S.C. 154(b) by 61 days.

(21) Appl. No.: 16/683,563

(22) Filed: Nov. 14, 2019

(65) Prior Publication Data

US 2021/0039363 A1   Feb. 11, 2021

Related U.S. Application Data

(60) Provisional application No. 62/884,786, filed on Aug. 9, 2019.

(51) Int. Cl.
  *B32B 27/08*   (2006.01)
  *B32B 7/027*   (2019.01)
  *B32B 27/30*   (2006.01)

(52) U.S. Cl.
  CPC .............. *B32B 27/08* (2013.01); *B32B 7/027* (2019.01); *B32B 27/30* (2013.01); *B32B 2255/10* (2013.01); *B32B 2255/26* (2013.01); *B32B 2307/4023* (2013.01)

(58) Field of Classification Search
  CPC ............................. B32B 27/306; B32B 27/304
  See application file for complete search history.

(56) References Cited

U.S. PATENT DOCUMENTS

| | | | | |
|---|---|---|---|---|
| 5,001,106 A | * | 3/1991 | Egashira | ................. B32B 27/08 503/227 |
| 5,102,717 A | * | 4/1992 | Butters | .................... B41M 5/52 428/195.1 |
| 5,700,586 A | | 12/1997 | Laiho et al. | |

(Continued)

FOREIGN PATENT DOCUMENTS

| | | |
|---|---|---|
| JP | H08-176316 A | 7/1996 |
| JP | H10-71662 A | 3/1998 |

(Continued)

OTHER PUBLICATIONS

Blanchard et al., "The Effects of Molecular Weight on Glass Transition by Differential Scanning Calorimetry," Can. J. Chem. vol. 52, 1974, pp. 3170-3175 (Year: 1974).*

(Continued)

*Primary Examiner* — Frank J Vineis
*Assistant Examiner* — Nicole T Gugliotta
(74) *Attorney, Agent, or Firm* — Frost Brown Todd LLC

(57) ABSTRACT

A plastic label is provided having a substrate film, an ink layer, and a coating layer interposed between the substrate film and the ink layer. The coating layer contains a first resin and a second resin, the first resin being an acrylic-acid copolymer resin having a first glass transition temperature and the second resin being an acrylic-acid copolymer resin having a second glass transition temperature that is lower than the first glass transition temperature. An apparent acid value of the coating layer is 40 to 150 mg KOH/g or less, and a total content percentage of the first resin and the second resin in the coating layer is 50 to 95 parts by mass.

13 Claims, 1 Drawing Sheet

(56) References Cited

U.S. PATENT DOCUMENTS

| | | | | |
|---|---|---|---|---|
| 2007/0292665 A1* | 12/2007 | Fukunaga | ............... | B32B 27/10 |
| | | | | 428/200 |
| 2010/0055418 A1* | 3/2010 | Takamatsu | .............. | C08L 33/14 |
| | | | | 428/203 |
| 2011/0039077 A1* | 2/2011 | Klemann | ............ | C09D 127/18 |
| | | | | 428/195.1 |
| 2017/0326774 A1* | 11/2017 | Idan | ........................ | B32B 27/40 |

FOREIGN PATENT DOCUMENTS

| | | | |
|---|---|---|---|
| JP | 2001-089508 A | 4/2001 | |
| JP | 2002-200697 A | 7/2002 | |
| JP | 2003-084670 | * 3/2003 | .............. G09F 3/00 |
| JP | 2003-084670 A | 3/2003 | |
| JP | 2017-114930 A | 6/2017 | |
| WO | WO 2003-091317 A1 | 11/2003 | |

OTHER PUBLICATIONS

Ogawa et al., "Effects of molecular weight on mechanical properties of polypropylene", Journal of Applied Polymer Science, 1869 (10): 1869-1871. (Year: 1992).*

International Search Report and Written Opinion for Application No. PCT/JP2020/005698 dated Apr. 14, 2020, 12 pages.

* cited by examiner

PLASTIC LABEL

PRIORITY

This application claims priority to U.S. Provisional Application No. 62/884,786, entitled "Plastic Label," filed on Aug. 9, 2019, the disclosure of which is incorporated by reference herein.

TECHNICAL FIELD

The disclosure relates to a plastic label.

BACKGROUND

In recent years, recycling plastic products is in high demand from a standpoint of resource conservation, an environmental standpoint, and the like. For example, for bottles made of polyethylene terephthalate (PET) (PET bottles), one such plastic product, methods of chemical recycling and material recycling are established.

Now, plastic products such as PET bottles are often affixed with a label made of plastic (plastic label) whose surface is coated with ink to display product information and the like. Subjecting plastic products affixed with such a plastic label to recycling causes the ink to become mixed in with recycled resin, and this causes opacification, degradation of physical properties, a reduced quality, and the like of a recycled product using the recycled resin. As such, plastic labels are currently not being recycled, and the reality is that they are disposed of after being removed from plastic products.

In light of environmental problems in recent years, this disposal of plastic labels is a problem that needs solving. As such, for example, JP 2003-84670 A discloses a plastic label that forms a coating layer that is soluble in an aqueous alkaline solution between an ink layer made of ink and a substrate film that is a substrate of the plastic label. According to this plastic label, by dissolving the coating layer by an alkali treatment, the ink layer and the substrate film can be separated with comparative ease.

However, in the art disclosed in JP 2003-84670 A, the presence of the coating layer sometimes reduces a printability of the ink layer. A reduced printability of the ink layer tends to reduce decorative properties of the plastic label. As such, it may be desirable to provide a plastic label with excellent decorative properties despite an ink layer having alkali desorption properties.

SUMMARY

A plastic label is provided with a substrate film, an ink layer, and a coating layer interposed between the substrate film and the ink layer. The coating layer contains a first resin and a second resin, the first resin being an acrylic-acid copolymer resin having a first glass transition temperature and the second resin being an acrylic-acid copolymer resin having a second glass transition temperature that is lower than the first glass transition temperature. An apparent acid value of the coating layer is about 40 milligrams of potassium hydroxide per gram (mg KOH/g) or greater and 150 mg KOH/g or less (about 40 to about 150 mg KOH/g), and a total content percentage of the first resin and the second resin in the coating layer is about 50 to about 95 parts by mass.

In the plastic label, the first glass transition temperature may be about 90° or higher and the second glass transition temperature may be lower than about 80° C.

In the plastic label, a difference between the first glass transition temperature and the second glass transition temperature may be about 20° C. or greater.

In the plastic label, the first resin and the second resin are a methacrylic acid-methyl methacrylate copolymer.

In the plastic label, the coating layer further contains a vinyl chloride-vinyl acetate copolymer.

In the plastic label, the coating layer further contains a cellulose derivative.

A plastic container is a labeled plastic container affixed with the above plastic label.

In the plastic container, a resin configuring the substrate film of the plastic label and a resin configuring the plastic container are resins of the same system.

A resin composition is a resin composition for the coating layer, containing a first resin and a second resin. The first resin is an acrylic-acid copolymer resin having a first glass transition temperature, and the second resin is an acrylic-acid copolymer resin having a second glass transition temperature that is lower than the first glass transition temperature. An acid value of the resin composition is about 40 to about 150 mg KOH/g, and a total content percentage of the first resin and the second resin relative to 100 parts by mass of a solid content is about 50 to about 95 parts by mass.

A recycling method of the present disclosure is a recycling method of the above plastic label, provided with the step of subjecting the plastic label to an alkali treatment to desorb the ink layer from the plastic label.

According to the plastic label of the disclosure, decorative properties can be improved despite the ink layer having alkali desorption properties.

BRIEF DESCRIPTION OF THE DRAWINGS

It is believed the present invention will be better understood from the following description of certain examples taken in conjunction with the accompanying drawings, in which like reference numerals identify the same elements and in which.

Figure 1:
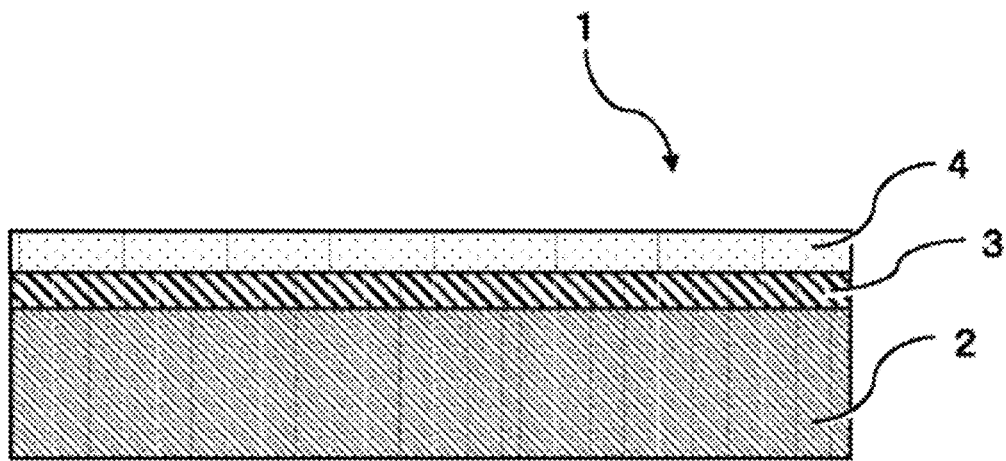
FIG. 1 is a partial cross-sectional schematic of a plastic label.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

A plastic label of the disclosure is a label that can impart displayability, decoration, functionality, and the like to a plastic container when affixed on the plastic container.

I. Exemplary Plastic Label

Referring to FIG. 1, a plastic label 1 is provided with a substrate film 2, an ink layer 4, and a coating layer 3 interposed between the substrate film 2 and the ink layer 4. The present embodiment illustrates the ink layer 4 and the coating layer 3 provided on one face of the substrate film 2, but a configuration of the plastic label 1 is not limited thereto. For example, the ink layer 4 and the coating layer 3 may be respectively provided on one face of the substrate film 2 and another face on an opposite side of this face.

A. Substrate Film

The substrate film 2 configures a base of the plastic label 1 and is a carrier (support) of the coating layer 3 and the ink layer 4. In other words, the substrate film 2 provides characteristics such as rigidity and shrinkability of the plastic label 1.

A type of resin forming the substrate film 2 can be selected as appropriate according to application or the like. For example, a polyester resin (such as polyethylene terephthalate, polyethylene naphthalate, or polylactic acid), a polystyrene resin (such as polystyrene or a styrene-butadiene copolymer), a polyolefin resin (such as polyethylene or polypropylene), a polyvinyl chloride resin, a polyamide resin, an aramid resin, a polyimide resin, a polyphenylene sulfide resin, an acrylic resin, and the like can be mentioned. The substrate film 2 may be configured from one type among these resins or from two or more types. When the substrate film is configured from two or more types of resins, the resins may be of the same resin system (that is, resins of the same system) or of different resin systems (that is, resins of different systems).

Here, "resins of the same system" signifies resins whose main repeating units are the same, and these are essentially compatible resins. As such, polyester resins are resins of the same type, styrene resins are resins of the same type, and polyolefin resins are resins of the same type. Note that "main repeating unit" refers to a repeating unit included at a percentage of 50 mol % or greater—such as 60 mol % or greater and 70 mol % or greater—among all components configuring the resin. When there are two or more types of monomers serving as the main repeating units as in a copolymer resin, this range is a percentage of a total of the two or more types of monomers.

The substrate film 2 is configured from a resin of the same system as a resin configuring a plastic container whereon the plastic label 1 is affixed. For example, when the plastic container is a PET bottle, the resin configuring the substrate film 2 is a polyester resin—in particular, PET. When this is the case, there is a merit of obtaining a recycled resin made of resins of the same system when a labeled plastic container is subjected to recycling without separating the plastic container and the plastic label. Moreover, PET is also suitable because it has an established recycling system.

Here, PET is specifically a polyester wherein a main component of a dicarboxylic-acid component is terephthalic acid and a main component of a diol component is ethylene glycol. Moreover, as another component, a dicarboxylic acid component such as isophthalic acid, phthalic acid, adipic acid, sebacic acid, or naphthalene dicarboxylic acid or a diol component such as diethylene glycol, neopentyl glycol, polyalkylene glycol, or 1,4-cyclohexanedimethanol may be included.

The substrate film 2 is a film having heat shrinkability (heat-shrinkable film). When the substrate film 2 is a heat-shrinkable film, decoration and workability (conformability to the container) are excellent and a wide display area can be had. Note that "heat-shrinkable film" signifies a substrate film whose heat-shrinkage factor at 90° C. over 10 seconds (also "heat-shrinkage factor (90° C., 10 s)") in a main orientation direction of the substrate film 2 is 15 to 90% and whose heat-shrinkage factor (90° C., 10 s) in a direction orthogonal to the main orientation direction is −3 to 15%. Note that the main orientation direction is a direction wherein the heat-shrinkage factor is the greatest.

The substrate film 2 may be a single-layer film made of one layer or a multilayer film made of two or more layers. When it is a multilayer film, it may include layers made of different types of resins. However, from a standpoint of recycling, it is configured of resins of the same system. Moreover, a thickness of the substrate film 2 is not particularly limited and may be 5 to 100 μm—such as 10 to 80 μm. Note that a known surface treatment such as a corona discharge treatment, a plasma treatment, a flame treatment, or an acid treatment may be applied as necessary to a surface of the substrate film 2.

B. Coating Layer

The coating layer 3 is a layer made by solidifying a coating-layer resin composition, (1) to (4) below being characteristic features thereof:

(1) contains a first resin that is an acrylic-acid copolymer resin having a first glass transition temperature $T1$;
(2) contains a second resin that is an acrylic-acid copolymer resin having a second glass transition temperature $T2$ that is lower than $T1$;
(3) has an apparent acid value of 40 to 150 mg KOH/g;
(4) has a total content percentage of the first resin and the second resin therein of 50 to 95 parts by mass.

A coating layer having the characteristic features of (1) to (4) above can have favorable alkali solubility. By a plastic film 1 being provided with a coating layer 3 having alkali solubility, an alkali treatment of the plastic film 1 removes the coating layer 3 interposed between the substrate film 2 and the ink layer 4. As such, desorption (alkali desorption) of the ink layer 4 from the plastic film 1 is facilitated.

Here, the coating layer 3 having alkali solubility signifies that when a plastic film 1 wherein a coating layer 3 whose vertical×horizontal is 4 cm×4 cm is formed on a substrate film 2 of any size and any printing layer 4 is provided on an entire upper face of the coating layer 3 is immersed in 1.5 parts by mass of 85° C. aqueous sodium hydroxide and vigorously stirred, 70 area % or more of the ink layer 4 is desorbed from the plastic label in an immersion time of 15 minutes.

Moreover, the coating layer 3 having the characteristic features of (1) to (4) above may have improved printability in addition to the above alkali solubility. As such, decorative properties of the ink layer 4 formed on the coating layer 3 can be improved. Printability, which greatly affects decorative properties of the ink layer 4 in a final product, can include trapping resistance, adhesion, and alkali resistance.

For example, when trapping properties of the coating layer 3 are low, a printing failure of overprinting occurs, resulting in unclear display of the ink layer 4. When adhesion of the coating layer 3 with another component (the ink layer 4 and/or the substrate 2) is low, the ink layer 4 is easily peeled. When an alkali resistance of the coating layer 3 is low, the ink layer 4 is easily peeled when, for example, the plastic label 1 is moved on a conveyor coated with a surfactant. Note that alkali resistance is resistance against 1.5 parts by mass of aqueous sodium hydroxide at 40° C. or lower.

As described in (1) and (2) above, the first resin and the second resin are each an acrylic-acid copolymer resin. Here, an acrylic-acid copolymer resin is a resin that has acrylic acid and/or methacrylic acid as a main repeating unit and has a copolymerization monomer that can copolymerize with the acrylic acid and/or the methacrylic acid. The acrylic-acid copolymer resin has a total percentage of the acrylic acid and/or the methacrylic acid and the copolymerization monomer in the resin of 60 mol % or greater.

As the copolymerization monomer, for example, a (meth) acrylic-acid alkyl ester such as methyl (meth)acrylate, ethyl (meth)acrylate, n-propyl (meth)acrylate, isopropyl (meth) acrylate, n-butyl (meth)acrylate, 2-ethylhexyl (meth)acrylate, or t-butyl (meth)acrylate [a lower alkyl ester such as (meth)acrylic acid]; a hydroxyl-group-containing (meth) acrylate such as hydroxyethyl (meth)acrylate; a glycidyl-group-containing (meth)acrylate such as glycidyl (meth) acrylate; a (meth)acrylamide such as N,N'-dimethyl (meth) acrylamide or N,N'-diethyl (meth)acrylamide; an amino-group-containing (meth)acrylate such as dimethylaminoethyl (meth)acrylate; a styrene such as styrene, vinyl toluene, or α-methylstyrene; a vinyl ester such as vinyl acetate or vinyl propionate; a vinyl halide such as vinyl chloride; a vinyl ether such as methyl vinyl ether; a carboxyl-group-containing vinyl such as itaconic acid or maleic anhydride [other than (meth)acrylic acid]; a cyano-group-containing vinyl such as acrylonitrile or methacrylonitrile; an olefin or a diene such as ethylene or propylene; and the like can be mentioned. The copolymerization monomer can be used independently or in a combination of two or more types. Note that the acrylic-acid copolymer resin has a total percentage of the acrylic acid and/or the methacrylic acid and the copolymerization monomer of 60 mol % or greater among the components configuring the resin.

In relation to (1) and (2) above, each Tg of the first resin and the second resin can be controlled by, for example, adjusting a mass-average molecular mass (Mm) of the acrylic-acid copolymer resin. Specifically, by increasing an Mm of the first resin to be greater than an Mm of the second resin, the first resin and the second resin can be imparted with a relationship of T1>T2, the Mm of the first resin is 30,000 or greater and 90,000 or less and the Mm of the second resin is 10,000 or greater and less than 30,000.

In relation to (3) above, the acid value of the coating layer signifies an acid value of a mixed resin made of two or more types of resins included in the coating layer 3. This apparent acid value can be adjusted by controlling respective acid values of the first resin and the second resin. The respective acid values of the first resin and the second resin can be adjusted by, for example, a blending ratio between the (meth)acrylic acid and the copolymerization monomer.

When the coating layer 3 fails to meet all of (1) to (4) above, the plastic film 1 may not excel in both alkali solubility and decorative properties. For example, when the coating layer 3 does not include two types of acrylic-acid copolymer resins with different glass transition temperatures, a blocking resistance, a whitening resistance, and the like become unbalanced in the coating layer 3, resulting in reduced decorative properties of the ink layer 4. Moreover, when the apparent acid value above is less than 40 mg KOH/g, the alkali solubility of the coating layer 3 becomes insufficient, making alkali desorption of the ink layer 4 difficult. Meanwhile, when the apparent acid value above exceeds 150 mg KOH/g, alkali resistance or adhesion is reduced, resulting in reduced decorative properties of the ink layer 4. Moreover, when the total content percentage above exceeds 95 parts by mass, handling properties of the resin composition for configuring the coating layer 3 are reduced, resulting in reduced decorative properties of the ink layer 4. Meanwhile, when the total content percentage above is less than 50 parts by mass, the alkali solubility of the coating layer 3 is reduced, making alkali desorption of the ink layer 4 insufficient.

In relation to (1) and (2) above, T1, the Tg of the first resin, is 90° C. or higher, such as 95° C. or higher, and particularly 100° C. or higher. An upper limit of T1 is not particularly limited but is about 120° C. due to physical properties of the acrylic-acid copolymer resin. T2, the Tg of the second resin, is lower than 80° C., such as 75° C. or lower, and particularly 65° C. or lower. A lower limit of T2 is not particularly limited but is about 30° C. from a standpoint of ease of handling. T1 and T2 have a difference of, for example, 20° C. or greater—such as a difference of 30° C. or greater, and a difference of 40° C. or greater. When this is the case, reduced printability can be more effectively suppressed, thereby improving the decorative properties of the ink layer 4.

In relation to (3) above, the apparent acid value of the coating layer 3 is 50 to 130 mg KOH/g and particularly 55 to 125 mg KOH/g. When this is the case, the coating layer 3 excels in both alkali solubility and printability.

The acid value of the first resin and each acid value of the second resin are each 40 to 150 mg KOH/g. When this is the case, the apparent acid value can be easily made to be 40 to 150 mg KOH/g. Moreover, the acid value of the first resin is lower than the acid value of the second resin. More specifically, the acid value of the first resin is less than 60 mg KOH/g and the acid value of the second resin is 80 mg KHO/g or greater.

In relation to (4) above, the total content percentage is 70 to 95 parts by mass such as 80 to 95 parts by mass. When this is the case, both alkali solubility and printability can be improved. Although a content percentage of the first resin and a content percentage of the second resin are not particularly limited, it is favorable for the content percentages to not greatly differ. When mutual content percentages greatly differ, there is a risk of reducing a synergistic effect of containing the two types of resins that are the first resin and the second resin. Specifically, a ratio of mutual content percentages (content of resin with greater content percentage/content of resin with lesser content percentage) is 3 or less.

That the coating layer 3 contains an alkali-soluble resin can be confirmed using various analytical techniques. For example, nuclear magnetic resonance (NMR), gas chromatography-mass spectrometry (GCMS), or the like can be used to confirm that an acrylic-acid copolymer resin is present in the coating layer 3 at a specified content. Moreover, the acid value of the coating layer 3 can be confirmed by, for example, titrating the coating layer 3. The titration can be calculated based on a result of, for example, dissolving the coating layer 3 in a titration solvent such as a mixed solvent of xylene and dimethylformamide and performing potentiometric titration using a potassium hydroxide solution of a predetermined concentration (for example, a 0.1 mol/L potassium hydroxide-ethanol solution). Moreover, that the coating layer 3 contains the first resin and the second resin of each Tg above can be confirmed by, for example, subjecting the coating-layer resin composition (described below) to a differential scanning calorimetry (DSC) method. The DSC method can be performed using "DSC 6200" made by Seiko Instruments Inc. under conditions of a heating rate of 10° C./min. Moreover, each Mm of the first resin and the second resin can be confirmed by, for example, gel permeation chromatography (GPC).

The first resin and the second resin above are a methacrylic acid-methyl methacrylate copolymer (also "MM copolymer" hereinbelow). When this is the case, both alkali solubility and printability can be especially excellent. The MM copolymer may be synthesized or a commercial product. As a commercial product suited as the first resin, for example, "Dianal LR-1941" and "Dianal BR-87" made by Mitsubishi Rayon Co. Ltd. can be mentioned. As a commercial product suited as the second resin, "JONCRYL JDX-C3000" made by BASF Japan Ltd., "ARUFON UC3000" made by Toagosei Co. Ltd., "BR-605" made by Mitsubishi Rayon Co. Ltd., and the like can be mentioned. Among these, the first resin and the second resin may be a combination of "Dianal LR-1941" and "JONCRYL JDX-C3000".

The coating layer 3 may include, in addition to the first resin and the second resin, another component to improve printability. As another component, a cellulose derivative can be mentioned. The coating layer 3 including a cellulose derivative improves the blocking resistance, the adhesion, and the like of the coating layer 3.

As the cellulose derivative, nitrocellulose, acetylcellulose, carboxymethylcellulose or a salt thereof, methylcellulose, hydroxypropyl methylcellulose, hydroxyethyl cellulose, hydroxypropyl cellulose, cellulose acetate butyrate, cellulose acetate propionate, and the like can be mentioned. For instance, nitrocellulose may be the cellulose derivative contained in the coating layer 3. In the coating layer 3, the cellulose derivative can be used independently or in a combination of two or more types.

A content of the cellulose derivative in the coating layer 3 relative to a total mass of the coating layer 3 is 1 to 20 parts by mass, such as 5 to 15 parts by mass, and particularly 8 to 12 parts by mass. When this content is less than 1 part by mass, improvement in the blocking resistance tends to be insufficient, and when this exceeds 20 parts by mass, a viscosity of the coating layer 3 becomes too high, making patchy printing more likely. The cellulose derivative has a degree of polymerization of 35 to 380, such as a degree of polymerization of 45 to 290, and particularly a degree of polymerization of 55 to 110. When this is the case, the above effects are improved.

Furthermore, as another component included in the coating layer 3, a vinyl chloride-vinyl acetate copolymer (also "VV copolymer" hereinbelow) can be mentioned. The coating layer 3 including a VV copolymer further improves adhesion between the substrate film 2 and the coating layer 3.

A content of the VV copolymer in the coating layer relative to the total mass of the coating layer 3 is 5 to 20 parts by mass, such as 8 to 18 parts by mass, and particularly 9 to 12 parts by mass. When this blending amount is less than 5, further improvement in the above adhesion tends to be insufficient, and when this exceeds 20 parts by mass, the viscosity of the coating layer 3 becomes too high, making patch printing more likely. The vinyl chloride-vinyl acetate copolymer has an Mm of 10,000 to 40,000, such as an Mm of 15,000 to 35,000. When this is the case, the improvement in adhesion can be higher.

Note that the coating layer 3 may contain a component other than the above such as a component known as a component that improves printability. However, an apparent acid value of all resins included in the coating layer 3 is 10 to 100 mg KOH/g. This is to sufficiently exhibit the effects of (1) to (4) above. Note that when, for example, the coating layer 3 includes the first resin, the second resin, the VV copolymer, and the cellulose derivative at respectively predetermined content percentages, a total of each content percentage×the acid value of each resin becomes the apparent acid value.

A thickness of the coating layer 3 is, for example, 0.1 to 5 μm, such as 0.3 to 3 μm. When the thickness of the coating layer 3 is less than 0.5 μm, the thickness of the coating layer 3 is more likely to become uneven, and this creates a risk of the substrate film 2 and the ink layer 4 making direct contact. A portion where the substrate film 2 and the ink layer 4 make direct contact cannot have alkali desorption properties. When the thickness of the coating layer 3 exceeds 5 μm, the blocking resistance is reduced, creating a risk of blocking arising when, for example, the plastic film 1 is wound up after printing (after manufacturing).

C. Ink Layer

The ink layer 4 is a layer made by solidifying an ink-layer resin composition and includes, for example, a pigment, a resin, and an additive. The ink layer can be formed using a conventionally known resin composition (printing ink) used in, for example, gravure printing, flexographic printing, or the like. In particular, when the ink layer 4 is poorly soluble in an aqueous solution (including water), an effect of alkali desorption by the coating layer 3 is improved.

The ink layer 4 may be provided over the entire upper face of the coating layer 3 or a portion thereof. A thickness of the ink layer 4 is not particularly limited and is, for example, 0.2 to 20 μm such as 0.5 to 10 μm.

D. Overcoating Layer

Figure 2:
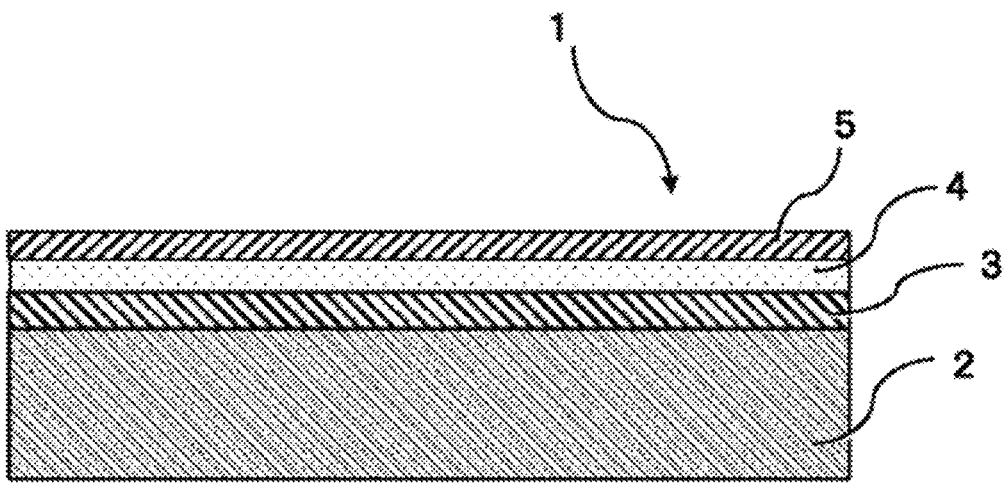
FIG. 2 is a partial cross-sectional schematic of the plastic label of FIG. 1 having an overcoating layer.

Furthermore, as illustrated in FIG. 2, the plastic label 1 may be further provided with an overcoating layer 5 on the ink layer 4. The overcoating layer 5 is a layer for protecting the ink layer 4 from external factors and is a layer made by solidifying a resin composition including, for example, a resin and a lubricant.

As the resin, for example, a thermoplastic resin such as polyvinyl chloride, polyvinyl acetate, a cellulose resin, an acrylic resin, or a urethane resin can be mentioned. As the lubricant, a particulate solid substance such as inorganic particles or organic particles, a wax (such as a synthetic wax such as a polyethylene wax or a fluorine-modified polyethylene wax, a mineral wax, or a natural wax), a silicone oil, and the like can be mentioned. A thickness of the overcoating layer 5 is not particularly limited and is, for example, 0.2 to 5 μm such as 0.3 to 3 μm.

E. Coating-Layer Resin Composition

The resin composition for the coating layer of the present disclosure (also "coating-layer resin composition") is a resin composition that can configure the coating layer 3 above by solidifying and is an alkali-soluble resin composition. Specifically, the coating-layer resin composition has the following characteristic features (5) to (8):

(5) contains the first resin that is the acrylic-acid copolymer resin having the first glass transition temperature T1;
(6) contains the second resin that is the acrylic-acid copolymer resin having the second glass transition temperature T2 that is lower than T1;
(7) has an apparent acid value of 40 to 150 mg KOH/g;
(8) has a total content percentage of the first resin and the second resin relative to 100 parts by mass of a solid content of 50 to 95 parts by mass.

The coating-layer resin composition having the characteristic features of (5) to (8) above can form the above coating layer by solidifying and can thereby enable desorption of the ink layer from the plastic film. It is needless to say that the coating-layer resin composition includes the cellulose derivative above and the vinyl chloride-vinyl acetate copolymer above. Blending ratios of each component are adjusted so the above contents are obtained when a total solid content after solidifying the coating-layer vinyl composition is defined as 100 parts by mass. Moreover, the coating-layer composition may include a solvent so a viscosity suited for a treatment such as coating is achieved. As a solvent, ethyl acetate, acetic acid-n-propyl, and the like can be mentioned.

III. Exemplary Labeled Plastic Container

A labeled plastic container of the present disclosure is a plastic container affixed with the plastic label 1 above. As a material of the plastic container, like the plastic label 1, a thermoplastic resin such as a polyester resin, a styrene resin, a polyolefin resin, or polyvinyl chloride can be used. The plastic container may be configured from one material among these materials or from two or more materials. In particular, the plastic container is made of a polyester resin, and PET is particularly suitable. This is because PET has an established recycling system. A usage amount of PET is become greater compared to other plastics, and an absolute value subjected to recycling is on the rise.

Furthermore, that the resin configuring the substrate film of the plastic label and the resin configuring the plastic container are resins of the same system is as above. As such, when the plastic container is a so-called PET bottle, the resin configuring the substrate film of the plastic label is a polyester resin such as PET.

IV. Exemplary Manufacturing Method of a Plastic Label

A method of manufacturing the plastic label 1 is described in more detail. First, the substrate film 2 serving as the base of the plastic label 1 is prepared. The substrate film 2 can be produced using a known method. For example, the substrate film 2 is produced by molding a film by a known method such as an extrusion method or a calendar method and, as necessary, further subjecting this film to a stretching treatment.

Next, the coating layer 3 is formed on at least one surface of the substrate film 2. For example, the coating layer 3 is easily formed by coating the coating-layer resin composition on a surface of the substrate film and solidifying this. A coating method is not particularly limited, and a known method can be used.

Next, the ink layer 4 is formed on one surface whereon the coating layer 3 is exposed. For example, the ink layer 4 is easily formed by coating the ink-layer resin composition on a surface of the coating layer 3 and solidifying this. A coating method is not particularly limited, and a known method can be used.

When the plastic label 1 is further provided with the overcoating layer 5, the overcoating layer 5 is easily formed by coating the resin composition for the overcoating layer on one surface whereon the ink layer 4 is exposed and solidifying this.

The plastic film 1 produced as above is then affixed on the plastic container as follows. Specifically, the plastic label 1 is cut to a desired size as needed and rolled into a tube so a face formed with each layer is on an inner side—that is, so this face contacts a surface of the plastic container. At this time, edges contacting each other due to the plastic label being rolled up are adhered by a known method. Note that although an adhesion method by an adhesive, a thermocompression bonding method, a heat-welding method, a welding method by a solvent, and the like can be mentioned as the known method, from a standpoint of recycling, a method that does not use an adhesive may be used.

When rolling up, if the plastic label 1 has a main stretching direction (direction exhibiting the greatest stretching), the rolling is performed so this main stretching direction becomes a circumferential direction. The tubular plastic label 1 is affixed on the plastic container that is, for example, a PET bottle. As above, the face formed with each layer is disposed on a plastic-container side. This is so unintentional damage to the ink layer 4 by external factors can be suppressed.

When the substrate film 2 is a heat-shrinkable film, the plastic film 1 affixed on the plastic container is subjected to a heating treatment. By this, the plastic film 1 changes into a shape conforming to an external shape of the plastic container.

V. Exemplary Recycling Method of A Plastic Label

A recycling method of the plastic label of the present disclosure is provided with a step of subjecting the plastic label to an alkali treatment to desorb the ink layer from the plastic label (desorption step). The plastic label desorbed of the ink layer or the plastic container affixed with this plastic label can be subjected to a known plastic recycling method. By this, plastic, a recyclable material, and the ink layer, which is a non-recyclable material, can be easily separated, and this can provide a recycled resin with a high added value.

The recycling method of the present embodiment may be provided with a step in advance of the above desorption step of removing the plastic label from the plastic container. For example, the removal step may be provided when the plastic container and the plastic label are made of different resin systems and separate collection is required. Meanwhile, when the plastic container and the plastic label are made of resins of the same system, these may be separated or an entirety of the labeled plastic container may be subjected to the alkali treatment. When this is the case, working steps in the recycling method are simplified.

Furthermore, the recycling method of the present embodiment may be provided with a step in advance of the above desorption step of crushing the labeled plastic container and/or the plastic label. The plastic that is the recyclable material and the ink layer that is the non-recyclable material can still be easily separated even when the crushed product is subjected to the alkali treatment.

A method of the alkali treatment is not particularly limited as long as the coating layer 3 of the plastic film 1 is exposed to an aqueous alkaline solution. For example, a method of immersing the plastic film 1 in an aqueous alkaline solution, a method of spraying the aqueous alkali solution on the plastic film 1, and the like can be mentioned. A temperature of the aqueous alkaline solution is 50 to 95° C., such as 70 to 95° C., and particularly 85 to 95° C. As a suitable aqueous alkaline solution, an aqueous solution including sodium hydroxide at 1 to 2 parts by mass relative to 100 parts by mass (total amount) can be mentioned. A time of the alkali treatment is 10 minutes or longer such as 20 minutes or longer, and when adopting an immersion method, the aqueous alkaline solution is stirred. Note that although the aqueous solution is a solution whose solvent is water, another solvent (such as alcohol), a surfactant, an additive, or the like may be included to an extent of not impairing a polarity of the water.

As above, according to the plastic label 1 of the present embodiment, the coating layer 3 is interposed between the ink layer 4 and the substrate film 2. This coating layer 3 has the characteristic features of (1) to (4) above and can thereby exhibit alkali solubility and high printability. As such, the ink layer 4 can have favorable decorative properties and alkali desorption of the ink layer 4 is possible.

Therefore, according to the present disclosure, in recycling the plastic label and, by extension, the labeled plastic container, ink can be easily suppressed from becoming mixed in with the recycled resin without the need for a complex apparatus or complex work. As such, a high-quality recycled resin wherein resin coloring, resin opacification, changed physical properties, and the like due to this mixing in are suppressed can be obtained.

The printability of the coating layer 3 particularly includes excellent blocking resistance, adhesion, and alkali resistance. Because the coating layer 3 excels in these particular aspects of printability, not only are the decorative properties of the ink layer 4 formed on the coating layer 3 not impaired but also an advantage is gained of there being no unnecessary restrictions on the ink used such that a desired ink can be used.

Of special note is that the coating layer 3 has excellent alkali resistance despite having alkali solubility. In other words, the coating layer 3 has excellent solubility in a strong alkali as well as excellent resistance (insolubility) against a weak alkali. As such, the coating layer 3 can have high resistance (insolubility) against, for example, a surfactant or the like coated on a conveyor despite having high reactivity (solubility) to the alkali treatment. Moreover, because the coating layer 3 has excellent alkali resistance, the plastic label 1 can also be suitably used on a plastic container whose content is, for example, a detergent.

VI. Examples

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Examples (No. 1 to 7) and Comparative Examples (No. 8 to 10)

Table 1 lists summaries (types, manufacturers, product names, and the like) of each component used to produce each resin composition no. 1 to 10. For components A to G, an acid value and a glass transition temperature (Tg) are also indicated. Moreover, a solid content (%) is indicated for components whose solid content is not 100 mass %. Among components included in each resin composition, two types among components A to G are the first resin and the second resin (or an alternative thereto).

TABLE 1

| | Type | Characteristics |
|---|---|---|
| Component A | M-M copolymer ("Dianal LR-1941," made by Mitsubishi Rayon Co. Ltd.) | Acid value: 50 mgKOH/g Tg: 110° C. Solid content: 25 mass % |
| Component B | M-M copolymer ("Dianal BR-87," made by Mitsubishi Rayon Co. Ltd.) | Acid value: 10 mgKOH/g Tg: 105° C. |
| Component C | M-M copolymer ("JONCRYL JDX3000," made by BASF) | Acid value: 85 mgKOH/g Tg: 65° C. |
| Component D | M-M copolymer ("ARUFON UC3000," made by Toagosei Co. Ltd.) | Acid value: 74 mgKOH/g Tg: 65° C. |
| Component E | M-M copolymer ("BR-605," made by Mitsubishi Rayon Co. Ltd.) | Acid value: 228 mgKOH/g Tg: 60° C. |
| Component F | Styrene-maleic acid copolymer ("SMA17352P," made by Cray Valley) | Acid value: 270 mgKOH/g Tg: 125° C. |
| Component G | Styrene-maleic acid copolymer ("SMA1440F," made by Cray Valley) | Acid value: 185 mgKOH/g Tg: 60° C. |
| Component H | V-V copolymer ("Solbin TA5R," made by Nissin Chemical Industry Co. Ltd.) | — |
| Component I | Cellulose derivative ("RS-1sec," made by Corea CNC) | Solid content: 70 mass % |

Among the components indicated in table 1 (component A to component I), predetermined components are combined as appropriate and a solvent (ethyl acetate and acetic acid-n-propyl) is further added to produce each resin composition no. 1 to no. 10. The components, blending ratios, and content percentages used are indicated in table 2 to table 4. In table 2 to table 4, "blending ratio" is a percentage (mass %) of each component used when producing the resin composition and "content percentage" is a content percentage of a solid content of each component in the coating layer produced using the resin composition. That is, the "blending ratio" is calculated in a form of including the solvent included in component A and component I and the "content percentage" is calculated in a form wherein all solvents are removed. "SMA copolymer" in table 4 signifies a styrene-maleic acid copolymer.

TABLE 2

|  | Example No. 1 | | Example No. 2 | | Example No. 3 | |
| --- | --- | --- | --- | --- | --- | --- |
|  | Blending ratio mass % | Content percentage mass % | Blending ratio mass % | Content percentage mass % | Blending ratio mass % | Content percentage mass % |
| Component A/ M-M copolymer | 20.4 | 24.6 | 21 | 25.7 | 22.0 | 27.9 |
| Component C/ M-M copolymer | 12.2 | 59.1 | 13 | 63.8 | 13.0 | 65.9 |
| Component H/ V-V copolymer | 1.2 | 5.9 | — | — | 1.2 | 6.2 |
| Component I/ Cellulose derivative | 3.1 | 10.4 | 3.1 | 10.5 | — | — |
| Solvent | 63.1 | — | 62.9 | — | 63.8 | — |

TABLE 3

|  | Example No. 4 | | Example No. 5 | | Example No. 6 | | Example No. 7 | |
| --- | --- | --- | --- | --- | --- | --- | --- | --- |
|  | Blending ratio mass % | Content percentage mass % | Blending ratio mass % | Content percentage mass % | Blending ratio mass % | Content percentage mass % | Blending ratio mass % | Content percentage mass % |
| Component A/ M-M copolymer | — | — | 20.4 | 24.7 | 2 | 3.1 | 20.4 | 24.6 |
| Component B/ M-M copolymer | 6 | 27.8 | — | — | — | — | — | — |
| Component C/ M-M copolymer | 12.2 | 56.7 | — | — | 8 | 49.1 | — | — |
| Component D/ M-M copolymer | — | — | 12.2 | 59.0 | — | — | — | — |
| Component E/ M-M copolymer | — | — | — | — | — | — | 10.0 | 48.2 |
| Component H/ V-V copolymer | 1.2 | 5.6 | 1.2 | 5.9 | 5 | 30.6 | 3.5 | 16.9 |
| Component I/ Cellulose derivative | 3.1 | 9.9 | 3.1 | 10.4 | 4 | 17.2 | 3.1 | 10.3 |
| Solvent | 77.5 | — | 63.1 | — | 81 | — | 63 | — |

TABLE 4

|  | Comparative example No. 8 | | Comparative example No. 9 | | Comparative example No. 10 | |
| --- | --- | --- | --- | --- | --- | --- |
|  | Blending ratio mass % | Content percentage mass % | Blending ratio mass % | Content percentage mass % | Blending ratio mass % | Content percentage mass % |
| Component A/ M-M copolymer | 20.4 | 24.7 | — | — | 20.4 | 24.7 |
| Component B/ M-M copolymer | 12.2 | 59.0 | — | — | — | — |
| Component F/ SMA copolymer | — | — | 5.0 | 24.3 | — | — |
| Component C/ M-M copolymer | — | — | 12.2 | 59.4 | — | — |
| Component E/ M-M copolymer | — | — | — | — | — | — |
| Component G/ SMA copolymer | — | — | — | — | 12.2 | 59.0 |
| Component H/ V-V copolymer | 1.2 | 5.9 | 1.2 | 5.9 | 1.2 | 5.9 |
| Component I/ Cellulose derivative | 3.1 | 10.4 | 3.1 | 10.4 | 3.1 | 10.4 |
| Solvent | 63.1 | — | 78.5 | — | 63.1 | — |

The plastic film is produced as below using the resin compositions produced according to the blending ratios indicated in table 1. First, as the substrate film, a film made of polyethylene terephthalate (PET film) of a thickness of 45 μm and a vertical×horizontal of 10 cm×10 cm is prepared. Next, using a gravure proof press, the coating-layer resin composition is coated on one surface of the PET film. By this, a coating layer of a thickness of 0.5 μm and a vertical× horizontal of 10 cm×10 cm is formed on the substrate film. Next, five colors of printing ink (product name: "Fine Wrap SBL," made by Dainippon Ink) are printed on this coating layer using the gravure proof press. By this, an ink layer of a thickness of 3 μm and a vertical×horizontal of 10 cm×10 cm is formed. By the above, the plastic films of no. 1 to no. 10 are produced. The produced plastic films are used to carry out the following tests.

Adhesion Test

A tape-peel test is carried out for a face of each plastic label whereon the five colors are printed (printing face). Specifically, cellophane tape is affixed on the printing face (surface whereon the printing layer is exposed) of each plastic label and the cellophane tape is afterward peeled from the printing face. A state of the printing face after peeling is visually observed. The following evaluation criteria are applied to observation results to evaluate adhesion between the coating layer and the printing layer. "AA" indicates the highest adhesion, and "C" indicates the lowest adhesion. AA, A, and B are determined to be usable.

AA: a percentage occupied by an area of the printing layer remaining on the plastic label among an area (100%) of the printing layer whereon the cellophane tape is affixed is 90% or greater;
A: this percentage is 85% or greater and less than 90%;
B: this percentage is 80% or greater and less than 85%;
C: this percentage is less than 80%.

Blocking-Resistance Test

A film made of the same material as the substrate film is superimposed on the printing face of each plastic label, a pressure of 10 kg/cm2 is applied to the surface, and this is left standing for 24 hours at 40° C. (80% humidity). Afterward, while maintaining an angle of 90 degrees, the superimposed film is instantaneously pulled and peeled off from the plastic label. The printing surface after peeling is visually observed. The following evaluation criteria are applied to observation results to evaluate blocking resistance. "AA" indicates the highest blocking resistance, and "C" indicates the lowest blocking resistance. AA, A, and B are determined to be usable.

AA: the film peels naturally and the printing layer does not transfer onto the film;
A: there is slight resistance in peeling the film, but the printing layer does not transfer onto the film;
B: there is slight resistance in peeling the film, and there is a mark on the film of peeling off the printing layer;
C: there is resistance in peeling the film, and the printing layer transfers.

Alkali Desorption Properties Test

Each plastic label is immersed in an 85° C. 1.5 mass % sodium hydroxide aqueous solution and stirred vigorously. During this, a desorption state of the printing layer is visually observed. In stirring, additional work such as work of pulling out and putting in the plastic label from and into the aqueous solution, work of exposing this to water, and work of rubbing are not carried out. The following evaluation criteria are applied to observation results to evaluate alkali desorption properties. "AA" indicates the most favorable alkali desorption properties, and "C" indicates the least favorable alkali desorption properties. S, A, and B are determined to be usable.

A: 80 area % or more of the ink layer is desorbed in a 15-minute immersion treatment;
B: 70 area % or more and less than 80 area % of the ink layer is desorbed in a 15-minute immersion treatment;
C: Less than 70 area % of the ink layer is desorbed in a 15-minute immersion treatment.

Alkali-Resistance Test

Each plastic label is immersed in a 40° C. 1.5 mass % sodium hydroxide aqueous solution, and this is stirred for 20 minutes. After stirring, the plastic label is removed and hand-washed in running water. Afterward, a peeling state of the printing layer is visually observed. The following evaluation criteria are applied to observation results to evaluate alkali resistance. "AA" indicates the highest alkali resistance, and "C" indicates the lowest alkali resistance. AA, A, and B are determined to be usable.

AA: a percentage occupied by an area remaining on the plastic label among an area of the printing layer (100%) is 90% or greater;
A: this percentage is 85% or greater and less than 90%;
B: this percentage is 80% or greater and less than 85%;
C: this percentage is less than 80%.

Table 5 indicates the results of each test. Moreover, table 5 simultaneously indicates an apparent acid value of the resins included in each coating layer (however, component A to component G), a content percentage of the resins in the coating layer, and the glass transition temperatures of the first resin and the second resin (or an alternative resin thereof).

TABLE 5

|  | No. 1 | No. 2 | No. 3 | No. 4 | No. 5 | No. 6 | No. 7 | No. 8 | No. 9 | No. 10 |
| --- | --- | --- | --- | --- | --- | --- | --- | --- | --- | --- |
| Apparent acid value (mgKOH/g) | 63 | 67 | 70 | 51 | 56 | 43 | 122 | 18 | 116 | 122 |
| Total content percentage (parts by mass) | 83.7 | 89.5 | 93.8 | 84.5 | 83.7 | 52.2 | 72.8 | 83.7 | 83.7 | 83.7 |
| Type of first resin | (A) | (A) | (A) | (B) | (A) | (A) | (A) | (A) | (F) | (A) |
| Tg (° C.) | 110 | 110 | 110 | 105 | 110 | 110 | 110 | 110 | 125 | 110 |
| Type of second resin | (C) | (C) | (C) | (C) | (D) | (C) | (E) | (B) | (C) | (G) |
| Tg (° C.) | 65 | 65 | 65 | 65 | 65 | 65 | 60 | 105 | 65 | 60 |
| Adhesion test | AA | A | A | A | AA | B | A | A | C | C |
| Blocking-resistance test | A | A | A | A | A | B | A | B | C | C |
| Alkali desorption properties test | A | A | A | A | A | B | A | C | A | A |
| Alkali-resistance test | A | A | A | A | A | A | A | A | A | A |

Referring to table 5, plastic labels provided with a coating layer formed by resin compositions no. 8 to 10, corresponding to comparative examples, exhibited a result of "C" in at least one test. In contrast, plastic labels provided with a coating layer formed by resin compositions no. 1 to 7 exhibited a result of "B" or higher in all test results.

Here, no. 1 to no. 3 are compared. Compared to the coating layer of no. 1, the coating layers of no. 2 and no. 3 respectively do not include a VV copolymer and a cellulose derivative. No. 1 to no. 3 exhibited excellent results in all tests, and the coating layer of no. 1 in particular had remarkably excellent adhesion.

No. 8 has an apparent acid value of the first resin and the second resin of 18 and does not meet (3) among (1) to (4)

above. Moreover, referring the test results, no. 8 is determined to be not actually usable in the alkali desorption properties test. In no. 9 and no. 10, the first resin and the second resin are not an MM copolymer but an SMA copolymer, and these therefore do not meet (1) or (2) among (1) to (4) above. Moreover, referring to the test results, no. 9 and no. 10 are determined to be not actually usable in the adhesion test and the blocking-resistance test.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

What is claimed is:

1. A plastic label, comprising:
   a substrate film;
   an ink layer; and
   a coating layer interposed between the substrate film and the ink layer;
   wherein the coating layer contains a first resin and a second resin, the first resin is an acrylic-acid copolymer resin having a first glass transition temperature, the second resin is an acrylic-acid copolymer resin having a second glass transition temperature that is lower than the first glass transition temperature, wherein an acid value of the first resin is less than 60 mg KOH/g and 40 mg KOH/g or greater, and the acid value of the second resin is 80 mg KOH/g or greater and 150 mg KOH/g or less such that an apparent acid value of the coating layer is 40 mg KOH/g or greater and 150 mg KOH/g or less, and a total content percentage of the first resin and the second resin in the coating layer is 50 parts by mass or greater and 95 parts by mass or less.

2. The plastic label of claim 1, wherein the first glass transition temperature is 90° C. or higher, and the second glass transition temperature is lower than 80° C.

3. The plastic label of claim 1, wherein a difference between the first glass transition temperature and the second glass transition temperature is 20° C. or greater.

4. The plastic label of claim 1, wherein the first resin and the second resin are a methacrylic acid-methyl methacrylate copolymer.

5. The plastic label of claim 1, wherein the coating layer further contains a vinyl chloride-vinyl acetate copolymer.

6. The plastic label of claim 1, wherein the coating layer further contains a cellulose derivative.

7. The plastic label of claim 1, wherein the plastic label is affixed to a plastic container.

8. The plastic label of claim 7, wherein a resin configuring the substrate film of the plastic label and a resin configuring the plastic container are resins of the same system.

9. The plastic label of claim 1, further comprising an overcoating layer on the ink layer.

10. A resin composition of a coating layer for a plastic label,
    wherein the coating layer is interposed between a substrate film and an ink layer,
    wherein the resin composition comprises:
        a first resin, wherein the first resin is an acrylic-acid copolymer resin having a first glass transition temperature; and
        a second resin, wherein the second resin is an acrylic-acid copolymer resin having a second glass transition temperature that is lower than the first glass transition temperature;
    wherein an acid value of the first resin is less than 60 mg KOH/g and 40 mg KOH/g or greater, and the acid value of the second resin is 80 mg KOH/g or greater and 150 mg KOH/g or less, and a total content percentage of the first resin and the second resin relative to 100 parts by mass of a solid content is 50 parts by mass or greater and 95 parts by mass or less.

11. The plastic label of claim 1, wherein the second resin has a mass-average molecular mass that is lower than a mass-average molecular mass of the first resin.

12. The plastic label of claim 11, wherein the mass-average molecular mass of the first resin is 30,000 or greater and 90,000 or less, and wherein the mass-average molecular mass of the second resin is 10,000 or greater and less than 30,000.

13. The plastic label of claim 1, wherein the first glass transition temperature is greater than 100° C.

* * * * *